United States Patent [19]

Hurd

[11] 3,991,721
[45] Nov. 16, 1976

[54] LOW EMISSION COMPOUND COMBUSTION ENGINE

[76] Inventor: Fraser A. Hurd, 103 Fifth St., Liverpool, N.Y. 13088

[22] Filed: Jan. 17, 1974

[21] Appl. No.: 434,017

[52] U.S. Cl. .............................. 123/1 R; 123/59 EC
[51] Int. Cl.² ........................................ F02B 75/12
[58] Field of Search ................... 123/1 R, 59 EC, 37, 123/22, 53 A, 53 R, 75 CC, 144; 60/620, 278, 279

[56] References Cited
UNITED STATES PATENTS

| | | | |
|---|---|---|---|
| 1,076,846 | 10/1913 | Slick | 123/37 |
| 1,238,223 | 8/1917 | Van Riper | 123/1 R |
| 1,239,523 | 9/1917 | Rogers | 123/53 A |
| 1,498,757 | 6/1924 | Robertson | 123/53 A |
| 1,504,096 | 8/1924 | Burtnett | 123/53 A |
| 2,091,411 | 8/1937 | Mallory | 123/53 A |
| 2,091,412 | 8/1937 | Mallory | 123/53 A |
| 2,113,601 | 4/1938 | Pratt | 123/1 R |
| 2,113,602 | 4/1938 | Pratt | 123/1 R |
| B282,390 | 1/1975 | Siewart | 123/1 R |

OTHER PUBLICATIONS
B282,390, 1/75, Siewart, 123/1 R.

Primary Examiner—Charles J. Myhre
Assistant Examiner—Ira S. Lazarus
Attorney, Agent, or Firm—Charles S. McGuire

[57] ABSTRACT

An internal combustion engine having one or more compounded pairs of undulating volumes, such as produced by a piston reciprocating within a cylinder or tri-shaped rotor orbiting within an epitrochordial shaped chamber, hereinafter referred to for convenience as cylinders. A total of eight cycles or "events" occur withiin paired cylinders which are located side-by-side in as close proximity as possible so as to share periodically common combustion and provided with combustible fuel mixtures prepared externally of the combustion chamber through conventional means, such as carburetion or jet systems. The fuel-air mixture, when involving a petroleum type fuel, is positively programmed to be burned internally in two stages, the first burn at elevated temperatures is a fuel-rich, oxygen-lean mixture to minimize the nitrous oxides produced, and the second burn at lower temperatures is a fuel-lean, oxygen-rich mixture to substantially complete combustion of unburned hydrocarbons and oxidize carbon monoxide prior to being exhausted to the atmosphere. To thus divide the combustion, the mixtures are not solely dependent upon stratified fluidic charges within each cylinder, but paired cylinders communicate to form a common combustion chamber to effect the second stage burn and extended power expansion by differential displacement. Both cylinders have inlet valves, only the second stage having an exhaust, a movable valve also being provided to allow communication between the cylinders at specific times during operation.

18 Claims, 5 Drawing Figures

3,991,721

LOW EMISSION COMPOUND COMBUSTION ENGINE

REFERENCE TO RELATED APPLICATION

Reference is made to the inventor's disclosure document No. 024349, dated Oct. 31, 1973.

BACKGROUND OF THE INVENTION

The present invention relates to internal combustion engines and, more specifically, to an improved engine construction resulting in lower emissions of harmful exhaust gases and conversion to useful work of a greater portion of the energy of combustion.

A great deal of research effort and money has been directed toward a suitble power system for automotive and other types of vehicles wherein the by-products of the energy source are ecologically acceptable. Automotive vehicles comprise a large share of the atmospheric pollution sources due to the level of nitrous oxides, carbon monoxide and unburned hydrocarbons contained in the exhaust gases of the engines used in the enormous number of such vehicles. Virtually all automotive engines in current use are of the internal combustion type and burn a fuel mixture of air and gasoline, or other petroleum type fuel. It is generally regarded as economically unfeasible to change in a short time from conventional mechanical engine designs to radically different types of power plants. Accordingly, those efforts which have received the greatest attention from a commercial standpoint are those which involve modification of existing equipment by adding filters, reactors, etc., to reduce harmful emissions.

Unfortunatly, the devices which have thus far been put into commercial use, and others which appear effective to produce acceptable emission levels from more or less standard engines tend to decrease substantially the efficiency in terms of power output per unit of fuel consumed. There is, therefore, a conflict between the use presently acceptable anti-pollution devices and conservation of basic energy sources.

It is a principal object of the present invention to provide an internal combustion engine having ecologically acceptable emissions while at the same time increasing the amount of work output per unit of fuel consumed.

Another object is to provide an engine having superior performance characteristics allowing smaller space and weight for the same horse power.

A further object is to produce a low emission, high efficiency internal combustion engine constructed of mechanical elements of the type currently in widespread commercial use in engines of this type.

Still another object is to provide an internal combustion engine wherein a minimal amount of heat energy is lost to the cooling medium through favorable ratio of area to volume.

A still further object is to provide an internal combustion engine having low emission of harmful gases while allowing a wide latitude of adjustments for control of fuel-air mixtures.

Other objects will in part be obvious and will in part appear hereinafter.

SUMMARY OF THE INVENTION

The invention is disclosed in somewhat diagrammatic form, the elemental parts selected for ease of disclosure being of a general type which has undergone nearly a century of refinement and experience in the context of automotive power plants. Therefore, these elements and the many alternative embodiments thereof are familiar to those skilled in the art and are not described in detail herein. The illustrated mechanical elements are more indicative of function than appearance, and the scope of the invention is not intended to be limited to the particular form chosen for discussion.

The engine includes means defining at least one pair of undulating (constantly either increasing or decreasing) volumes, disclosed in the most familiar form of pistons reciprocating within cylinders. The cylinders of each pair are usually arranged side-by-side, with first and second stage in juxtaposition for differentially compounded expansion, with axes parallel and in close proximity. An inlet valve is arranged in or near the top of each paired cylinder, and suitable atomizing means for preparing externally of the combustion chamber a charge of proper fuel-air ratio are associated with the inlet valve specifically of the first stage and optionally of the second stage, depending on the type of service. A valve is provided to allow direct communication between the paired differental displacement chambers at selected times in the operational cycle, and a valve for exhaust to the atmosphere is provided in only the second stage cylinder, thereby allowing extended expansion of the second stage and scavenging of the first stage therethrough.

A total of eight identifiable events are associated with one complete operation cycle of the cylinders paired for compound differential displacement. These events occur in four essentially concurrent pairs, as follows: first stage cylinder intake, or reception of a fuel-rich, oxygen-lean charge simultaneously with its second stage mated cylinder exhausting to atmosphere; first stage compression and second stage intake of a fuel-lean, oxygen-rich charge; first stage combustion and power stroke concurrently with second stage compression; and, upon the timed opening of the valve so that the two chambers communicate to form a common combustion chamber with the first and second stage pistons near the bottom and top of their respective strokes, second stage combustion and differential power stroke, with the smaller first stage discharging and scavenging itself into the substantially larger second stage. The second stage displacement is significantly larger than the first to effectively extract additional work from the greatly extended expansion with final exhaust pressure so close to atmospheric as to allow replacement of the power robbing muffler with a non-restricting resonator.

DETAILED DESCRIPTION

Figure 1:
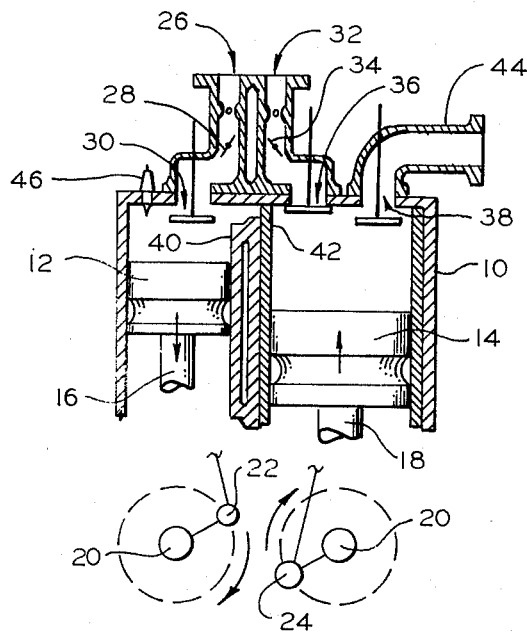
FIGS. 1–4 are fragmentary, partly diagrammatic, elevational views in vertical section, illustrating in extremely simplified form the functional sequence of engine operation.

The simplified form of engine shown in FIGS. 1–4 includes the usual frame or block 10 wherein the cylinders are formed. Pistons 12 and 14, having rods 16 and 18, respectively, associated therewith in the usual manner, are arranged to reciprocate within the two illustrated cylinders. Both rods are connected to crankshaft 20, which would actually extend transversely of the two cylinders, but is shown rotated 90° and separately for each cylinder in order to indicate in each view the position and direction of movement of the respective rod ends 22 and 24 which are linked to crankshaft 20.

Henceforth, the cylinder including piston 12, and parts and events associated therewith, will be termed "first stage," and those associated with the cylinder including piston 14 will be termed "second stage,". First stage fuel mixing means 26, having the usual valves, ports, etc., including throttle valve 28, is arranged to provide an atomized combustible charge through inlet valve 30 to the first stage cylinder. The charge comprises a mixture in predetermined ratio of liquid fuel and air, such ratio appropriately being relatively rich in fuel and lean in oxygen in order to achieve the desired result, as described more fully hereinafter.

The second stage may be provided with similar fuel mixing means 32, having throttle valve 34, inlet valve 36 and exhaust valve 38. It will be noted that the wall separating the first and second stage cylinders, denoted by reference numeral 40, terminates short of the upper cylinder head, providing a space for direct communication between the two cylinders. In one or the other of the paired cylinders, optionally in the second stage cylinder, as shown, a vertically slideable sleeve valve 42 is provided. The valve may, of course, take other forms such as a sliding plate valve with its own type of movement, and is opened at selected times in the operating cycle to provide communication between the first and second stage displacement chambers, thereby forming a common combustion chamber at such times. Sleeve valve 42, as well as inlet and exhaust valves 36 and 38, may be operated by any of a number of well-known mechanisms such as, for example, those disclosed in the article "Single Sleeve Valve Design" from the Nov. 18, 1926 issue of the publication Automotive Industries.

As pictured in the sequence of pictorial diagrams 1–4, the first events to occur are intake or ingestion of the fuel charge into the first stage concurrently with exhaust from the second stage. As shown, first stage inlet valve 30 is open, piston 12 is moving downward, second stage inlet 36 is closed, exhaust 38 is open, piston 14 is moving upward, and valve 42 is closed. Final exhaust from the second stage to the atmosphere takes place through manifold 44.

Figure 2:
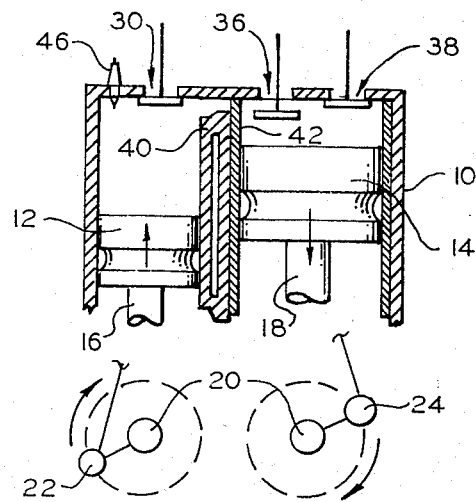
Figure 3:
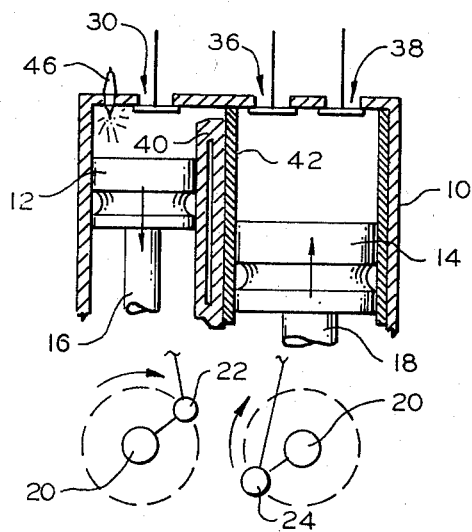
Figure 4:
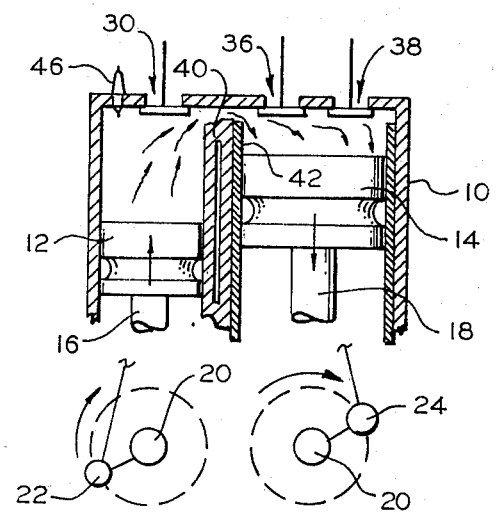

Since FIGS. 2–4 are merely illustrative of additional functions, only those portions operationally associated with such functions are shown. In FIG. 2, first stage compression occurs as piston 12 moves upwardly with inlet valve 30 and valve 42 closed. At the same time, second stage piston 14 moves downwardly to draw in a fresh air charge, which may or may not include an atomized fuel, or catalyst, through inlet valve 36, exhuast valve 38 now being closed. For reasons which will presently be apparent, the quantity of oxygen in the lean charge ingested by the second stage during any one cycle is appropriately equal to or in excess of that required for complete combustion of both the by-products from the first stage together with any fuel which may have been ingested by the second stage. That is, the second stage change is oxygen-rich, fuel-lean and may, in fact, include no fuel at all depending on conditions associated with the first stage burn, and the power demand at that time. At any rate, second stage fuel mixture and throttling, or other intake control, are preferably automated to the throttled variability of the first stage, and for engines proposed to be operated continuously at a fixed speed and load, throttle valve 34, or its equivalent, may be omitted, with preference given to a fixed type orifice of appropriate proportions.

The elements are pictured in FIG. 3 just after combustion of the first stage charge by igniter 46. The heat energy generated by the combustion, resulting in rapid pressure increase of the gas within the first stage cylinder, provides power to move piston 12 downwardly and turn crankshaft 20. At the same time, piston 14 is moving upwardly within the second stage cylinder with valves 36, 38 and 42 closed, thereby compressing the charge in the second stage cylinder.

It is anticipated that many variations and refinements such as combustion chamber contouring, timing, valving, porting, and tuning of the engine will be possible. It is assumed for purposes of the present discussion, however, that since in the preferred arrangement, volumetric displacement of the second stage cylinder is substantially greater than that of the first stage to effect final power expansion most effectiently by differential displacement, that likewise the theoretical compression ratio of second stage be greater than first stage to permit a relationship of volume to area within the first stage most favorable for minimal heat loss of the cooling medium without jeopardizing total overall expansion efficiency, and that for normal operation the sleeve valve 42 separating the stages begins to open at some point in advance of pistons 12 and 14 reaching their bottom and top dead centers, respectively, viz: at a point between the positions of the elements shown in FIGS. 3 and 4. It is deemed desirable to have the ascending pressure of the second stage on compression at about the same level as that of the descending, end pressure of the first stage while still on power, when valve 42 begins to open in order to avoid erosion of the valve seal by wire drawing. Also, it is a preferred feature that not only the displacement ratio be substantially greater but likewise the concomitant rate of compression of second stage exceed that of first stage so that the second stage's compression pressure peaks at a faster rate than the first stage's rate of pressure depletion, this makes the second stage dominate, and the first stage submissive, in that the pressure within the second stage while each is approaching their respective dead centers, be somewhat, although not excessively, in excess of that within the first stage to the degree that there is an initial "backwash" of an oxygen rich charge from second stage into first stage to mix with the hot byproduct gases thereof to initiate second stage combustion as an afterburn with its flame front properly in advance of second stage power expansion whereby to effect complete stoichiometric and final combustion early in the second stage stroke for maximum power impulse from the expanding gases. This advanced "backwashing" makes for more thorough mixing of the first and second stage gases while sharing the same combustion space, and provides for valve 42 an initial bathing of the sealing surfaces by the fresh air charge from the second stage as the valve first cracks open, rather than being immediately subjected to the severe heat, velocity and eroding turbulence of gases transposed from the first stage.

The second combustion is an afterburn and is final, taking place internally for additional work expansion and not externally as with retrofit devices, and is approprately timed preferably just prior to the instant pistons 12 and 14 reach their bottom and top dead centers, respectively. This second combustion preferably occurs spontaneously from the copulative "backwash" mixing of the hot byproduct gases, not fully expanded and still under pressure, of first stage with that of second stage's oxygen rich charge which by compression is at some lesser temperature but similar pressure. Except for warmup or special conditions any further aid of igniter 46, or its equivalent such as a supplementary glow plug, hot bulb, etc., for second stage burn is not deemed necessary. Opening of valve 42, normally initiates second stage combustion as a spontaneous afterburn and with the second stage's higher displacement and compression ratio causing pressure in the second stage cylinder to peak rapidly and reach a pressure complementing that for the first stage, before their respective dead centers, as just described, allows ample time for improved advance mixing of the fresh, oxygen rich charge from the second stage cylinder with the by-products of incomplete first stage combustion. The common combustion chamber shared by the first and second stage cylinders at the time of initiating the second burn, receives a second charge which this time is intentionally rich in oxygen, a condition most compatible with power efficiency and a clean exhaust; oxygen is intentionally in short supply during the high temperature first burn to minimize $NO_x$ and in ample supply at the lower temperature second burn to eliminate HC and CO.

The elements are pictured in FIG. 4 just after the second stage burn, after pistons 12 and 14 have begun upward and dpownward movement, respectively. This is the power stroke of piston 14, imparting mechanical energy to crankshaft 20, through differential displacement of the second over the first stage as piston 12 moves upward to evacuate the gases from the first into the second stage cylinder through open valve 42. The operational cycle is then complete and begins again as the elements return to the position of FIG. 1.

Figure 5:
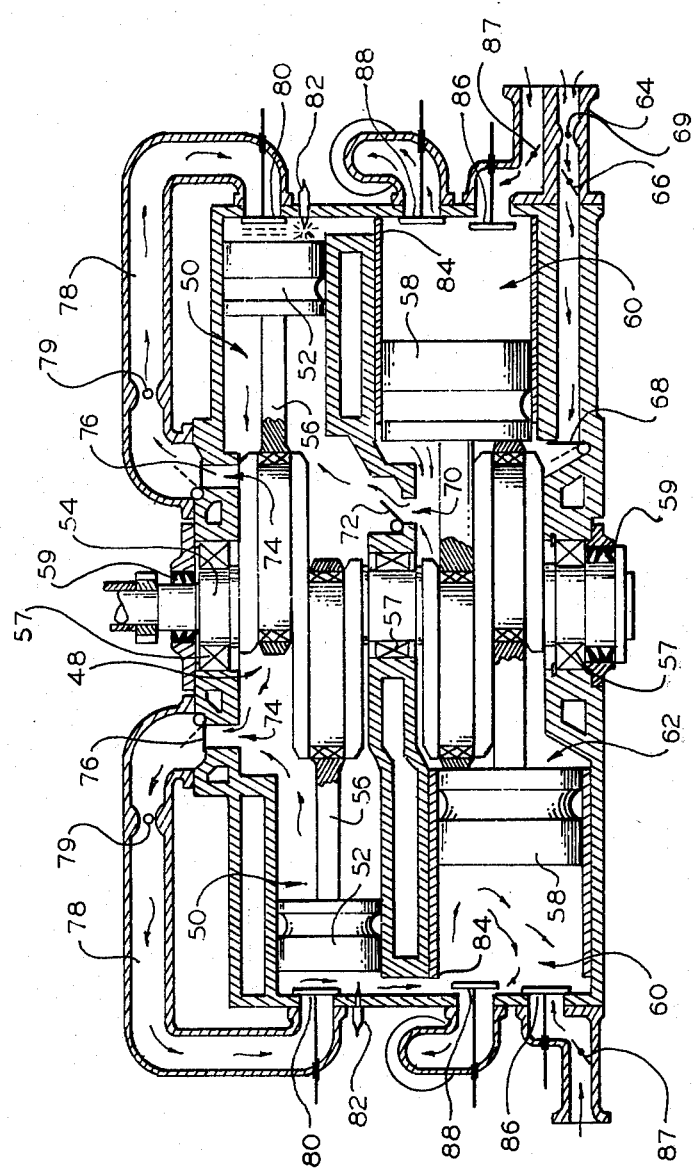
FIG. 5 is a somewhat more detailed elevational view, in half-section, of an engine embodying the invention.

In FIG. 5 is shown a four cylinder, opposed piston, pancake-type engine embodying the invention. This design may be expanded to eight, or more cylinders with fully opposed, V-type and other cylinder configurations which are also practical, but with lower performance potential than the fully opposed configuration. The numeral 48 denotes a first crankcase sealed volume defined by the walls of the crankcase and first stage cylinders 50, and the opposing sides of first stage pistons 52. The same reference numerals are used to denote identical portions of each of the two opposed first stages, as well as to identical elements of the opposed second stages. First stage pistons 52 are connected to crankshaft 54 by suitable bearings on the ends of connecting rods 56. Conventional bearings 57 and seals 59 are also provided where the shaft extends through the crankcase inner and outer walls.

Second stage pistons 58 reciprocate within cylinders 60 toward and away from one another to alternately compress and expand second crankcase volume 62. As pistons 58 diverge to expand volume 62, an air charge is drawn through inlet means 64, having any Venturi restrictions and the like which may be found desirable, and including main throttle valve 66 which primarily controls engine output. Flapper valve 68, or equivalent, is opened as the air charge is drawn into volume 62 and closed as pistons 58 converge to decrease the volume of this space, thereby compressing the air charge. It is to be noted that second stage pistons 58 function, on the crankcase side, as first stage pre-compression pistons. If desired a supply of lubricating oil may be provided through opening 69 to form a lubricating mist in the air entering the crankcase. Conventional lubricating systems may, of course, be provided in the usual manner.

The initially compressed air passes through opening 70 in the wall separating crankcase volumes 48 and 62, this opening also being provided with a flapper-type check valve 72, or equivalent. Converging movement of pistons 52 produces further compression of the air charge within volume 48, and movement thereof through opening 74, having flapper valves 76, or equivalent, into inlet manifolds 78. As the compressed air charge moves through manifolds 78 a fuel charge is metered through openings 79 for mixing in proper proportions with the air. The fuel-air mixture, which at this point is fuel-rich, oxygen-lean, is introduced for charging first stage cylinders 50 through inlet valves 80.

Continued operation of each paired set of first and second stage cylinders within each bank of cylinders from this point is essentially identical to that described in connection with FIGS. 1–4. After first stage reception of the combustible charge through inlet valves 80, the valves close and pistons 52 diverge to compress the charge for the final time within cylinders 50, two stages of crankcase pre-compression having already been accomplished. Igniters 82 then produce combustion within cylinders 50. It should be understood at this point that as pistons 52 move toward one another, one cylinder is on the intake cycle or event as the other is on its power stroke. Likewise, as pistons 52 move apart, one is compressing the fuel-air mixture prior to ignition while the other is discharging the gases from the first stage to the second stage cylinder.

As explained in connection with FIGS. 1–4, the fuel charge provided to the first stage cylinders is of a mixture ratio, appropriately fuel-rich, oxygen-lean, whereby the temperature and pressure of combustion are compatible with producing low amounts of oxides of nitrogen. Besides control by mixture ratio, peak temperature is controlled by the isothermal pre-compression and the evaporative cooling effect of the fuel-rich charge. After first stage combustion provides the power stroke of the first stage pistons, the second stage burn occurs, with sleeve valves 84 of second stage cylinders 60 open to provide a common, or communicating combustion chamber between the paired first and second stage cylinders. At this time inlet and exhaust valves 86 and 88, respectively, of the second stage cylinders are closed, and the power stroke of pistons 58 moves them to the position shown. As pistons 52 move to the top of their respective cylinders with sleeve valves 84 open and all other valves closed, during the second stage power stroke, gases from the first stage cylinders are transferred to the second. Exhaust valves 88 then open and the next diverging stroke of pistons 58 expels the gases to the atmosphere.

Second stage inlet valves 86 then open, exhaust and sleeve valves 88 and 84, respectively, closing, and a fresh air charge is ingested into the second stage cylinders. This charge may or may not have atomized fuel included therein, depending on the composition of the gases after first stage combustion, and the type of engine application. That is, with the fuel rich mixture indicated, first stage combustion will leave unburned hydrocarbons and carbon monoxide which may be combustible in the second stage burn without mixing additional fuel therewith. Metering valve 87 in the intake line to the second stage, may be provided if required and suitably automated to throttle valve 66 to attain optimum engine performance. At any rate, the conditions of the second stage burn will be such as to reduce to an acceptable low level the HC and CO without producing additional $NO_x$ in objectionable quantities.

As previously mentioned in connection with the first stage cylinders, although the cycle of events has been described as it occurs through either side of the engine, it is again pointed out that opposed cylinders of the same stage are not undergoing the same event at the same time. As pistons 58 move toward one another, to the position shown in FIG. 5, one is on its power stroke as gases from the first stage are discharge into the second, while the other is on its intake stroke, receiving a fresh charge through intake valve 86. As shown in FIG. 5, second stage piston 58 on the left has just completed its power stroke with inlet valve 86 closed. Exhaust valve 88 has just opened to atmosphere. Complete release of pressure from first stage cylinders 50 may take place by opening exhaust valve 88 while valve 84 is still open, as shown in FIG. 5, or, as an optional refinement, valve 84 may close substantially simultaneously with exhaust valve 88 opening, since it has been noted that a residue of the combustion products carried over into the subsequent cycle has been beneficial for further minimizing $NO_x$. At the same time, the second stage piston on the right has just completed the intake of fresh air charge (with or without additonal fuel or catalyst) through open valve 86, exhaust valve 88 and valve 84 being in the closed positions.

Although the foregoing description has concentrated principally upon the function and operation of the eight-event engine, multiple structural embodiments based on these operating principles will be apparent to those skilled in the art. In fact, one of the major advantages of the invention is the wide range of design options and continued refinements in the area of piston engines which are made possible within the framework of an engine having low emission, high performance and high efficiency potential.

What is claimed is:

1. An eight-event, compound cycled engine comprising, in combination:
    a. first and second enclosed power chambers each having therein a movable element to create an alternately increasing and decreasing enclosed volume;
    b. inlet means associated with each of said chambers;
    c. exhaust means to the atmosphere only through said second chamber;
    d. restractable wall means between said first and second chambers movable between retracted and closed positions and through which the enclosed volumes of said first and second power chambers directly communicate when in said retracted position, thereby forming a common chamber;
    e. means for introducing a fuel-rich, oxygen-lean first charge through said inlet means to said first power chamber;
    f. means for igniting said first charge to provide a power impulse to the movable element within said first chamber;
    g. means for introducing a fuel-lean, oxygen-rich second charge through said inlet means to said second power chamber; and
    h. means for opening said retractable wall means subsequent to said power impulse within said first chamber and introducing said second charge, thereby creating combustible mixing within said common chamber and of said second charge with the by-products of said first charges partial combustion.

2. An eight-event, compound cycled engine as set forth in claim 1 wherein the volume of displacement of the movable element within said second power chamber is significantly greater than the volume of displacement of the movable element within said first power chamber.

3. An eight-event, compound cycled engine as set forth in claim 2 wherein said movable elements comprise pistons, and said first and second power chambers comprise portions of cylinders on the inlet side of said pistons.

4. An eight-event, compound cycled engine as set forth in claim 3 wherein said cylinders are arranged side-by-side, in close proximity, with parallel axes.

5. An eight-event, compound cycled engine as set forth in claim 4 wherein said valve means is arranged in a wall separating said cylinders at the upper end of each.

6. An eight-event, compound cycled engine as set forth in claim 3 and further including third and fourth cylinders, said fourth cylinder having a maximum volume significantly greater than said third cylinder, and a common crankshaft to which all four of said cylinders are connected.

7. An eight-event, compound cycled engine as set forth in claim 6 and further including a crankcase wherein said crankshaft is at least partially enclosed, said crankcase having one enclosed volume variable by reciprocating movement of said first and third pistons, and another enclosed volume variable by reciprocating movement of said second and fourth pistons, air inlet means into said other volume for compression within said crankcase, and means for introducing the air compressed within said crankcase through said inlet means to said first and third power cylinders.

8. An eight-event, compound cycled engine as set forth in claim 7 and further including fuel inlet means for mixing a fuel charge with the compressed air between said crankcase and said first and third power cylinders.

9. An eight-event method of operating a series compound combustion engine having a pair of adjacent enclosed chambers of differential volume, each having a movable element to create therein alternately increasing and decreasing differential enclosed volumes, said method comprising:
    a. introducing a fuel-rich, oxygen-lean first stage charge into the first stage chamber, by increasing volume thereof;
    b. exhausing gases of prior cycle from the second stage chamber, by decreasing the volume thereof to the atmosphere concurrently with introducing said first stage charge;
    c. compressing said first stage charge by decreasing the volume within said first stage chamber;

d. introducing a fuel-lean, oxygen-rich second stage charge into the second stage by increasing the volume thereof concurrently with compressing said first stage charge;
e. igniting and partially burning said first stage charge for power expansion within the first stage chamber;
f. compressing said second stage charge by decreasing the volume within said second stage chamber concurrently with power expansion within the first stage chamber;
g. causing the first and second stage chambers to directly communicate and form a common enclosed volume, thereby allowing said second stage charge to mix with the by-products of partially burning said first stage charge, and causing the resulting mixture to extend and sustain , continuity of combustion, substantially uninterupted to complete the burning of combustible elements thereof, for second stage power expansion by differential displacement within the chanbers; and
h. transferring gases from the first stage, by decreasing the volume thereof, to the second stage chamber concurrently with power differential expansion by displacement within said chambers to provide power impulse to the movable element within the second stage chamber.

10. The method as set forth in claim 9 wherein the pressure created by decreasing the volume within said second stage chamber is made to increase by compression to approximate that within said first stage chamber at the time said chambers are caused to directly communicate.

11. The method as set forth in claim 9 wherein said second stage charge is at least partially transferred to said first stage chamber upon causing of said first and second stage chambers to directly communicate.

12. The method as set forth in claim 9 wherein the composition of said first stage charge, and the temperature and pressure resulting from ignition of said first charge are such as to minimize formation of oxides of nitrogen as a product of partially burning said first charge.

13. The method as set forth in claim 12 wherein the composition of said mixture and the temperature and pressure at which said mixture is burned are such as to maximize oxidation of carbon monoxide and unburned hydrocarbons resulting from said partial burning of said first stage charge.

14. The method as set forth in claim 9 wherein the compositions of said by-products of partially burning said first stage charge and that of said second stage charge, and the temperature and pressure of said by-products and said second stage charge at the time said first and second stage chambers are caused to directly communicate are such that combustion is substained spontaneously.

15. A method as set forth in claim 9 and including the further step of pre-compressing said first stage charge, prior to introducing the latter into said first stage power chamber.

16. The method as set forth in claim 15 wherein said second stage charge consists essentially entirely of air, with no fuel added thereto.

17. The method as set forth in claim 15 wherein said second stage charge includes air with a fuel mixed therein.

18. The method as set forth in claim 17 wherein said second stage charge includes a catalyst.

* * * * *